Sept. 24, 1968 J. READMAN ETAL 3,402,750
DEVICE FOR LOCKING TWO MEMBERS
Filed Aug. 16, 1966 2 Sheets-Sheet 1
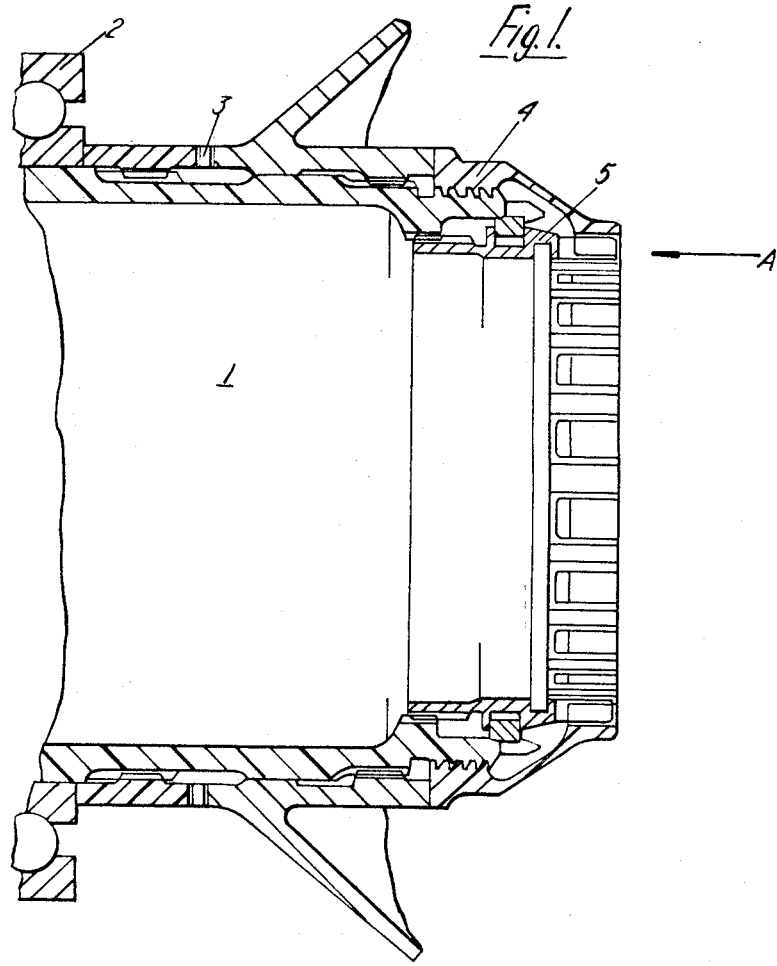
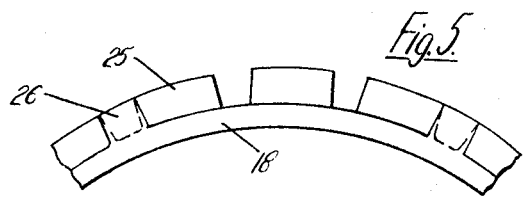
Inventors
John Readman
Wilfred Henry Wilkinson
By Cushman, Darby & Cushman
Attorneys

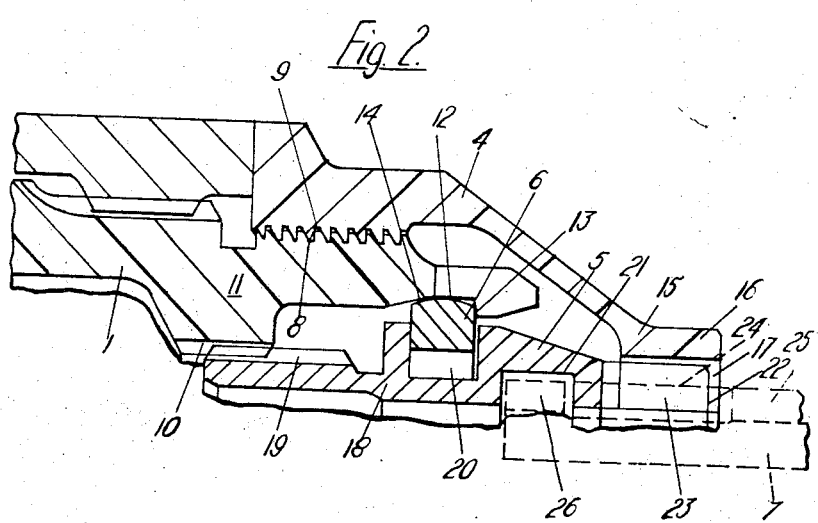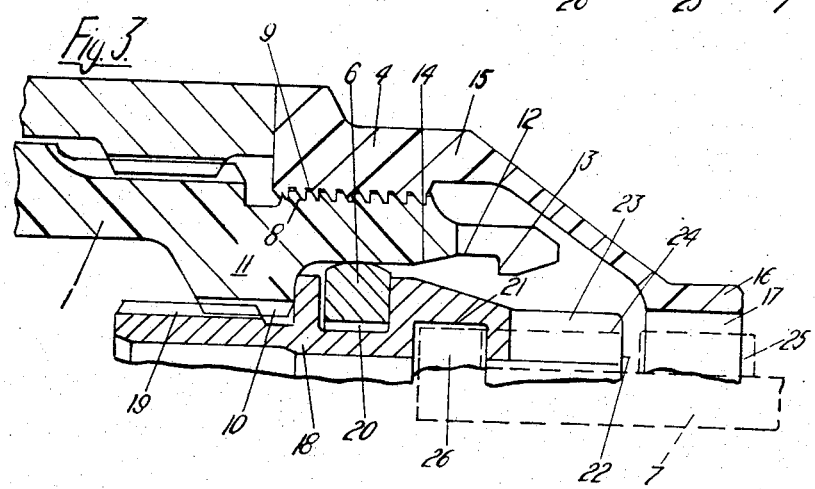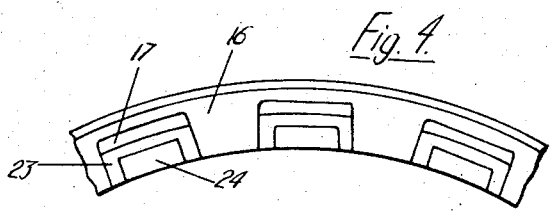

United States Patent Office 3,402,750
Patented Sept. 24, 1968

3,402,750
DEVICE FOR LOCKING TWO MEMBERS
John Readman, Allestree, Derby, and Wilfred Henry Wilkinson, Turnditch, England, assignors to Rolls-Royce Limited, Derby, England, a British company
Filed Aug. 16, 1966, Ser. No. 572,744
Claims priority, application Great Britain, Sept. 29, 1965, 41,280/65
9 Claims. (Cl. 151—8)

ABSTRACT OF THE DISCLOSURE

A device for locking two members rotatably secured to one another in a fixed positional relationship. The device includes a locking member engaging each of said two members to prevent relative rotation, the locking member being movable to a second position where it is disengaged from one of the members thus permitting relative rotation of the two members. A spanner engageable with the locking member for moving the same is so arranged that it cannot be disengaged from the one member of the two relatively rotatable members until the locking member is returned to a position where it engages the member to which it had previously become disengaged.

---

The present invention relates to a means for locking two members in a fixed positional relationship in such a manner as to obviate the necessity for visual inspection. Although not so restricted the invention will be described in its particular application to a gas turbine engine.

It is essential in gas turbine engines to ensure that the nut which retains the turbine rotor disc on the main engine shaft, is locked in position and usually visual inspection is necessary to make certain that this is so. However, the rotor disc retaining nut in this particular case is in an inaccessible part of the engine where visual inspection is not possible.

It has become necessary to devise a means for locking the nut on the shaft in such a manner as to be certain that the nut is properly locked without the need for visual inspection.

According to the present invention, therefore, there is provided a device for locking two members in a fixed positional relationship comprising locking means adapted to be engaged either simultaneously with both the said members or to be disengaged from at least one of the said members, means for disengaging the locking device from the said one member and engagement means for engaging with means on the said one member for effecting relative movement between the two members, and means for preventing the disengagement of the said engagement means from the said one member until the locking means re-engages the said one member to prevent further relative movement of the two members.

The two said members may comprise a nut and a shaft and the locking means may be a sleeve which fits concentrically within the shaft.

The sleeve may be formed with two sets of splines, one set for engagement with each of the two members, and is preferably capable of axial movement relative to the two members.

Preferably the means for disengaging the locking sleeve from one of the members and the engagement means for the one member are formed on the same spanner.

The spanner may be a cylindrical spanner and may have two sets of axially spaced apart splines thereon, the two sets being angularly offset from each other.

Means are also preferably provided for limiting the axial movement of the locking device and said means may comprise a spring ring.

One embodiment of the invention will now be described in more detail, merely by way of example, with reference to the accompanying drawings in which:

FIGURE 1 shows a side elevation of a shaft and nut assembly incorporating the locking device of the present invention.

FIGURE 2 shows an enlarged sectional view of FIGURE 1 showing the locking device in its locking position.

FIGURE 3 shows a further enlarged sectional view of FIGURE 1 showing the locking device in its non-locking position.

FIGURE 4 shows an enlarged view of FIGURE 1 in the direction of arrow A.

FIGURE 5 shows an enlarged end view of part of the spanner of the present invention.

Referring now to the drawings there is shown a shaft 1 mounted for rotation in bearings 2, a coupling 3 mounted on the said shaft for retaining a rotor disc in driving engagement with the shaft 1. The coupling is held on the shaft by a nut 4 which is locked onto the shaft by the locking device shown generally by the numeral 5.

FIGURES 2 and 3 show the locking assembly in more detail the said assembly comprising the shaft 1, the nut 4, a locking sleeve 5, a spring ring 6, and a spanner 7 for tightening the assembly.

The shaft 1 is formed with a threaded portion 8, which engages with a threaded portion 9 on the nut 4, and a plurality of internally formed axially extending splines 10 on a flange 11 which extends radially inwardly from the internal bore of the shaft.

An annular recess 12 is also formed internally at the rearward end of the shaft 1, the said recess having its rearward wall 13 extending radially to form an abutment face and the opposite wall 14 disposed at an angle to the shaft axis.

The nut 4 comprises an extended portion 15 which tapers axially of the shaft and rearwardly of the threaded portion 9 to a smaller diameter at its rearward end 16. The rearward end 16 is formed internally with a plurality of circumferentially spaced apart axially extending slots 17.

The locking sleeve 5 comprises an annular body part 18 which is disposed radially inwardly of the shaft 1 and is formed at its forward end with a plurality of circumferentially spaced apart axially extending splines 19 on its outer surface, which splines are adapted to engage the splines 10 on the shaft in such a way as to prevent relative rotation between the shaft 1 and the sleeve 5 but to allow relative axial movement therebetween.

A recess 20 is formed in the radially outer surface of body part 18 of the sleeve 5 which recess is adapted to contain the spring ring 6, and a further recess 21 is formed in the radially inner surface of the body part 18 of the sleeve.

At its rearward end 22 the locking sleeve 5 is formed with axially extending splines 23 which are adapted to engage the slots 17 in the nut and each spline 23 is provided with an axially extending groove 24 in its inner surface as is shown in FIGURE 4.

The spanner 7 is cylindrical and is formed with a set of axially extending and circumferentially spaced apart splines 25 at its rearward end and a plurality of circumferentially spaced apart dogs 26 at its forward end.

The dogs 26 are of such a size that they can pass through the grooves 24 in the locking sleeve and said dogs are angularly offset relative to the splines 25 as can be seen from FIGURE 5.

The splines 25 are adapted to cooperate with the slots 17 to provide means for rotating the nut 4.

In order to alter the relative positional relationship between the nut and the shaft, the operation is as follows: starting from the position shown in FIGURE 2, the dogs 26 of the spanner are pushed through the grooves 24 in the locking sleeve until the end of the spanner abuts the wall of the recess 21. The dogs 26 can now rotate in the recess 21 of the locking sleeve and the spanner is rotated until the splines 25 line up with the slots 17 in the nut.

The spanner 7 is then further introduced into the assembly pushing the locking sleeve axially until the splines 23 on the locking sleeve disengages the slots 17 of the nut. This position of the locking sleeve is shown in FIGURE 3. During this time the spring ring is compressed into the recesses 20 by the compressing action of the top surface of the spring ring 6 sliding over the sloping surface 14.

The spanner may now be rotated to tighten the nut. This will alter the alignment of the splines 23 and the slots 17 and the alignment must be restored before the locking sleeve can be returned to the position shown in FIGURE 2 by further tightening the nut 4. By this means it is ensured that the nut 4 and shaft 1 are in the correct angular relationship.

While the splines 25 and the slots 17 are in engagement the dogs 26 will abut the spaces between the grooves 24 as can be seen from FIGURE 5 and on withdrawal of the spanner the splines 23 on the locking device will be pulled into engagement with the slots 17 and the spring ring will be withdrawn and will expand up the slope 14 and finally will abut the face 13 of the recess 12.

By this time the splines 25 will have become disengaged from the slots 17, the locking sleeve will be in its correct axial locking position, and the spanner will again be free to rotate without rotating the nut 4.

By rotating the spanner the dogs 26 can be brought into alignment with the grooves 24 and the spanner can then be withdrawn axially.

Although the invention has been described with reference to the main shaft and nut of a gas turbine engine it is in no way meant to be limited thereto. For example such a device may be equally well applicable to an automatic machine where it is necessary to be certain that two members are in correct positional relationship before it is safe for the machine to operate.

Further the spanner described above may have parts that are radially movable into and out of engagement with the nut depending on the axial position of a conical locking sleeve.

We claim:

1. A device for locking two members in a fixed positional relationship, said two members including means securing the same together by relative rotation of the same, and each of said two members including an engagement means, said device comprising: a locking member having a first engagement means thereon for engaging the engagement means of one of said members and preventing relative rotation therebetween and a second engagement means for engaging the engagement means of the other of said members and preventing relative rotation therebetween, said locking members being movable between an operative position in which said first and second engagement means of the locking member respectively engage the engagement means of said two members to lock said two members in the fixed positional relationship and an inoperative position in which one of said first and second engagement means of said locking member is disengaged from the engagement means of its respective members of said two members so that said two members may be rotated relative each other on said securing means; a spanner for moving said locking member between said operative and inoperative positions, means detachably coupling the spanner to the locking member, said spanner having engagement means thereon for engaging the engagement means of the respective member of said two members which becomes disengaged from the engagement means of said locking member so that rotation of said spanner rotates one of said members relative to the other; and means on said locking member operatively coacting with an abutment means on the respective member of said two members for preventing the disengagement of the spanner relative to said locking member until the engagement means of said spanner is disengaged from the engagement means of the said one member and until the locking member is movable to the operative position to engage with the said one member to prevent further relative movement of the two members.

2. A device as claimed in claim 1 and in which the two members to be locked in position are a shaft and a nut.

3. A device as claimed in claim 2 and in which the locking member comprises a sleeve which fits concentrically within the shaft.

4. A device according to claim 3 wherein said sleeve is provided with two sets of axially extending circumferentially spaced apart splines defining said first and second engagement means on said locking member.

5. A device according to claim 2 and in which the said sleeve is capable of axial movement relative to the shaft.

6. A device according to claim 1 and in which the said spanner is cylindrical.

7. A device according to claim 6 and in which the spanner comprises a plurality of angularly spaced apart dogs and a plurality of angularly spaced apart axially extending splines, said splines being angularly offset relative to the said dogs.

8. A device according to claim 1 and in which means are provided for limiting the axial movement of the locking device.

9. A device according to claim 8 and in which the said means for limiting the axial movement of the locking device comprises a spring ring.

References Cited

UNITED STATES PATENTS

| 859,063 | 7/1907 | Henson | 151—8 |
| 913,712 | 3/1909 | Dyer | 151—8 |
| 3,015,870 | 1/1962 | Ely | 151—8 |

FOREIGN PATENTS

| 155,583 | 3/1954 | Australia. |

EDWARD C. ALLEN, *Primary Examiner.*